United States Patent [19]

Tsukamoto et al.

[11] 4,326,785
[45] Apr. 27, 1982

[54] CAMERA HAVING A CONNECTOR COMMON TO A FLASH BULB UNIT AND AN ELECTRONIC FLASH UNIT

[75] Inventors: Masaaki Tsukamoto, Tokyo; Yuji Ohkubo, Ohmiya; Naoki Tomino, Tokyo, all of Japan

[73] Assignee: Nippon Kogaku K.K., Tokyo, Japan

[21] Appl. No.: 235,682

[22] Filed: Feb. 18, 1981

[30] Foreign Application Priority Data

Feb. 29, 1980 [JP] Japan .................. 55-24908[U]

[51] Int. Cl.³ .............. G03B 7/00; G03B 15/05; G03B 17/08
[52] U.S. Cl. ............... 354/60 F; 354/64; 354/145
[58] Field of Search ........... 354/33, 34, 60 F, 60 R, 354/129, 145, 64

[56] References Cited

U.S. PATENT DOCUMENTS

| | | | |
|---|---|---|---|
| 3,786,734 | 1/1974 | Long et al. .................. | 354/64 |
| 3,971,050 | 7/1976 | Okuno et al. ............... | 354/145 X |
| 4,016,575 | 4/1977 | Uchiyama et al. ......... | 354/33 |
| 4,067,028 | 1/1978 | Lermann et al. ........... | 354/145 X |
| 4,095,245 | 6/1978 | Kuraishi .................... | 354/145 X |
| 4,190,335 | 2/1980 | Maitani ..................... | 354/34 |
| 4,222,647 | 9/1980 | Kawarada et al. ......... | 354/145 |

*Primary Examiner*—Donald A. Griffin
*Attorney, Agent, or Firm*—Fitzpatrick, Cella, Harper & Scinto

[57] ABSTRACT

A camera provided with first connecting means capable of being selectively coupled to second connecting means of a flash bulb unit and third connecting means of an electronic flash unit and having a first terminal connectable in common to a synchronizing terminal in the second connecting means and a tuning shutter time setting signal terminal in the third connecting means, a second terminal connected to a synchronizing terminal in the third connecting means, and a third terminal connected in common to ground terminals in the second and third connecting means includes a tuning shutter time setting circuit having its input terminal connected to the first terminal, and a protective circuit for the tuning shutter time setting circuit.

4 Claims, 5 Drawing Figures

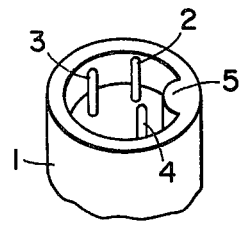
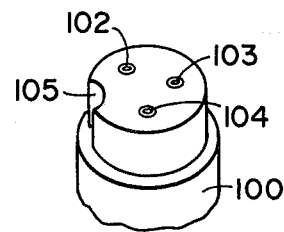
FIG. 1A PRIOR ART
FIG. 1B PRIOR ART
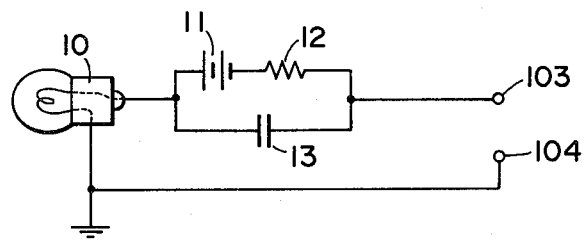
FIG. 2 PRIOR ART
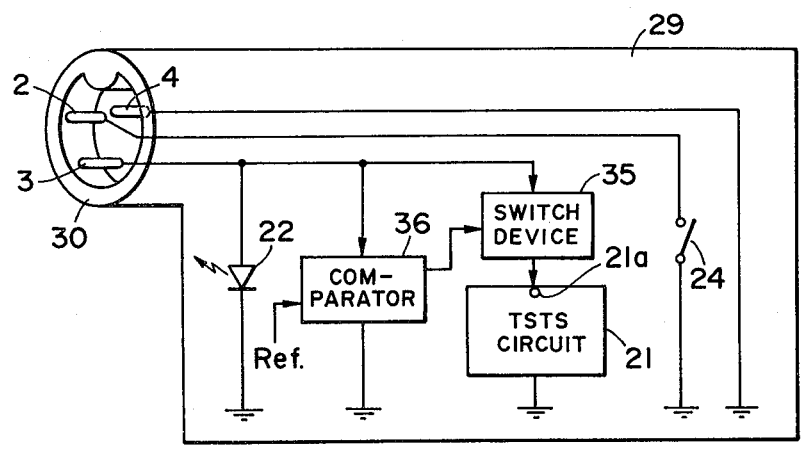
FIG. 4

CAMERA HAVING A CONNECTOR COMMON TO A FLASH BULB UNIT AND AN ELECTRONIC FLASH UNIT

BACKGROUND OF THE INVENTION

1. Field of the Invention

This invention relates to a camera having a connector common to a flash bulb unit and an electronic flash unit, and particularly to a camera which receives the shutter time setting signal from the electronic flash unit and automatically sets the shutter time to an electronic flash tuning time, and to an underwater camera system including an underwater flash bulb unit, an underwater electronic flash unit and an underwater camera.

2. Description of the Prior Art

A synchroconnector for an underwater camera (e.g. NIKONOS III manufactured and sold by Nippon Kogaku K. K. of Japan) and an underwater flash unit which is now commercially available will first be described by reference to the accompanying drawings. Referring to FIGS. 1A and 1B, the conventional synchronizing connector for an underwater camera comprises a socket 1 shown in FIG. 1A and a plug 100 shown in FIG. 1B. The socket 1 is provided on the underwater camera, and the plug 100 is attached to the underwater flash unit. In order that this synchronizing connector may be usable both with an underwater electronic flash unit and an underwater flash bulb unit, the socket 1 is provided with a X contact terminal 2 for synchronizing the underwater electronic flash unit, a FP contact pin terminal 3 for synchronizing the underwater flash bulb unit, a ground contact pin terminal 4 and a projection 5 for correctly positioning the plug 100. The plug 100 is provided with spring-like terminals 102, 103, 104 forming holes into which the pin terminals 2, 3, 4 of the socket 1 may be inserted, and a positioning cut-away 105 corresponding to the projection 5. Clamp means effective when the socket 1 and the plug 100 have been coupled together and the waterproof mechanism in the connector are not shown in the drawing.

Description will now be made of the case in which an underwater flash bulb unit is used as an underwater flash unit. The underwater flash bulb unit, as shown in FIG. 2, is provided with a flash bulb 10, a battery 11 having its positive pole connected to one terminal of the flash bulb, a resistor 12 connected to the negative pole of the battery 11, a capacitor 13 parallel-connected to the serial circuit of the battery 11 and the resistor 12, a terminal 103 of the plug 100 connected to the negative pole of the battery 11 through the resistor 12, and a ground terminal 104 of the plug 100. When the plug 100 is coupled to the socket 1 of the underwater camera, the terminals 102, 103 and 104 come into contact with the pins 2, 3 and 4, respectively. When, by the release operation of the underwater camera, the synchronizing signal in the underwater camera is transmitted to the underwater flash bulb unit, that is, the terminals 103 and 104 are short-circuited, the underwater flash bulb 10 emits flashlight. Of course, at this time, the terminal 102 and pin terminal 2 for the electronic flash unit are ineffective. Where an underwater electronic flash unit is used as an underwater flash unit, a light emission start signal is sent from the camera side to the underwater electronic flash unit through the terminals 102, 104 of the connector and the pin terminals 2, 4 that is, the terminals 102 and 104 are short-circuited and flashlight is emitted. At this time, the terminal 103 and pin 3 for the underwater flash bulb unit perform no function.

However, in recent years, underwater flash bulb units have scarcely been used and thus the pin 3 of the connector for flash bulb has become substantially unnecessary.

On the other hand, recently, the advance of the electronic instrumentation of cameras has brought about wide use of electric shutters provided with a tuning shutter time setting circuit which, when an electronic flash unit is used, automatically sets the shutter time to an electronic flash tuning speed by a tuning shutter time setting (TSTS) signal from the electronic flash unit side. Accordingly, where such an electric shutter is used in an underwater camera, a pin terminal and spring-like terminal for X contact, a pin terminal and spring-like terminal for shutter time setting signal, and a pin terminal and spring-like terminal for ground become necessary in a connector (hereinafter referred to as the new type connector) for connecting together an underwater electronic flash unit designed to produce a tuning shutter time setting signal (hereinafter referred to as the new type underwater electronic flash unit) and an underwater camera designed such that the shutter time is automatically set to a tuning speed by the shutter time setting signal (hereinafter referred to as the new type underwater camera). However, providing interchangeability between new and old connectors so as to render the new type underwater electronic flash unit usable in conjunction not only with the new type underwater camera but also with an underwater camera (hereinafter referred to as the old type underwater camera) provided with a connector (hereinafter referred to as the old type connector) equipped with the above-described pin terminals 2, 3, 4 and spring-like terminals 102, 103, 104 for X contact, FP contact and earth, respectively, and conversely to render an underwater electronic flash unit having the old type connector (hereinafter referred to as the old type underwater electronic flash unit) usable in conjunction with the new type underwater camera as well would be preferable to persons who already possess the old type underwater cameras and the old type underwater electronic flash unit. To achieve such interchangeability, the positional relations among the pin terminals and the spring-like terminals and the projection and the cut-away may be determined so as to be identical between the old type connector and the new type connector. That is, in the new type connector, the pin 3 of FIG. 1A may be connected to the tuning shutter time setting circuit of the camera and the terminal 103 of FIG. 1B may be used as the tuning shutter time setting signal terminal of the new type electronic flash unit. However there is the following problem. The existing electric shutter is designed such that the shutter time setting signal is a positive electrical signal. In the new type underwater electronic flash unit, in order to be compatible with an underwater camera incorporating such an electric shutter therein, it is necessary that a positive potential signal as the shutter time setting signal should be produced at the terminal 103 of the new type connector, whereas in the conventional underwater flash bulb unit, as shown in FIG. 2, a negative potential is applied to the terminal 103 of the old type connector. Therefore, if the plug of the conventional underwater flash bulb unit is, by mistake, coupled to the socket of the new type underwater camera, the possibility will exist that the tuning shutter time setting circuit in the camera will malfunction or be damaged.

Reversely connecting the battery 11 in the underwater flash bulb unit would also be conceivable, but the positive potential produced thereby at the terminal 103 is a relatively great voltage of the order of 3V or higher while, on the other hand, the shutter time setting signal is a relatively small voltage of the order of 1V or lower and therefore, the above-noted problem would still exist.

SUMMARY OF THE INVENTION

We have conceived and contribute by the present invention an underwater camera of simple construction which has a connector common to a flash bulb unit and an electronic flash unit and in which even if the plug of the flash bulb unit is, by mistake, connected to a camera having a tuning shutter time setting circuit, the tuning shutter time setting circuit in the camera will not malfunction or be damaged.

Our contribution also enables us to provide a camera system including an underwater flash bulb unit, a new type underwater electronic flash unit, an old type underwater camera and a new type underwater camera.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIGS. 1A and 1B are perspective views showing the socket and plug, respectively, of the conventional synchronizing connector for underwater cameras;

FIG. 2 is a circuit diagram of the conventional underwater flash bulb unit;

FIG. 4 is a circuit diagram showing another example of the circuit of the underwater camera according to the present invention.

DESCRIPTION OF THE PREFERRED EMBODIMENTS

Figure 3:
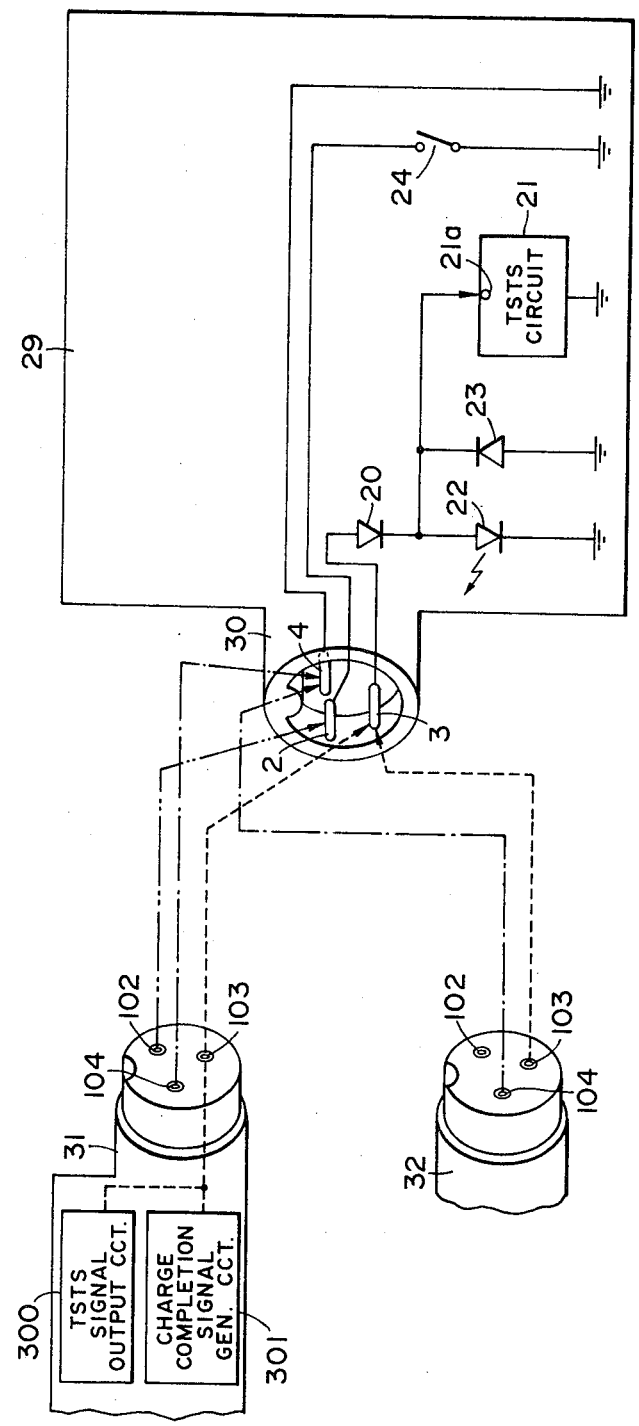
FIG. 3 is a circuit diagram of the underwater camera according to the present invention.

Referring to FIG. 3 which illustrates an example of the circuit of a new type underwater camera, a diode 20, which functions as a protective circuit, has its anode connected to the pin terminal 3 of the socket 30 of a camera 29, and the input terminal 21a of a tuning shutter time setting circuit 21 is connected between the cathode of the protective diode 20 and ground. A ready light-emitting diode 22, which indicates whether or not an underwater electronic flash unit is in ready-to-flash condition, has its anode connected to the cathode of the diode 20 and its cathode grounded. The turn-on of the light-emitting diode 22 can be viewed within the viewfinder of the camera. A diode 23 has its cathode connected to the cathode of the diode 20 and its anode grounded. The pin terminal 2 for X contact of the socket 30 is grounded through the X contact 24, and a grounding pin terminal 4 is directly grounded.

The shape of the socket 30 of the camera 29 is the same as that shown in FIG. 1A.

When the plug 31 of a new type underwater electronic flash unit is coupled to the socket 30 of this new type underwater camera and then the power supply switch or the like of the underwater electronic flash unit is closed, a tuning shutter time setting signal, which is a relatively weak current, is supplied from the tuning shutter time setting signal output circuit 300 of the underwater electronic flash unit to the tuning shutter time setting circuit 21 through the terminals 103 and 3 of a new type connector and through the diode 20. In response to the tuning shutter time setting signal, the tuning shutter time setting circuit 21 automatically sets the shutter time of the camera to the tuning time of the electronic flash unit. Also, when the electronic flash unit reaches ready-to-flash condition, namely, when a main capacitor has been completely charged, a ready light turn-on current which is greater than the weak current flows in likewise from a charge completion signal generating circuit 301 through the terminals 103 and 3 wherefore the light-emitting diode 22 for the ready light is turned on to indicate the ready-to-flash condition. Of course, the operation of the tuning shutter time setting circuit 21 may be effected by the ready light turn-on current instead of the weak current. Upon closing of the X contact 24 resulting from the release operation of the camera that follows, the unshown electronic flash unit emits light in well-known manner.

When the plug 32 of a flash bulb unit has, by mistake, been coupled to the socket 30 of such new type underwater camera, a negative voltage will be applied to the terminal 3 of the socket from the flash bulb unit. However, due to the presence of the diode 23, this negative voltage will be directed to the diode 20. Therefore, by selecting the withstand voltage of the diode 20 to a value sufficiently greater than the negative voltage, the light-emitting diode 22 and the circuit 21 are protected from the negative voltage. At this time, the light-emitting diode 22 is not turned on and therefore, erroneous release operation can be prevented.

In the above-described embodiment, a negative potential from the underwater flash bulb unit and a positive potential as the shutter time setting signal from the new type underwater electronic flash unit are applied to the camera and therefore, the discrimination therebetween and the blocking thereof can be effected by the diode 20. However, more generally, a design may be made such that, as shown in FIG. 4, a switch device 35 is inserted between the terminal 3 of the socket 30 of the camera 29 and the input terminal 21a of the tuning shutter time setting circuit 21 so that the turn-on and turn-off of the switch device 35 is controlled by the output of a comparator 36 which compares the potential of the terminal 3 with a predetermined reference potential level Ref. and inverts its output in accordance with the magnitude thereof. That is, in an arrangement wherein a negative potential from the underwater water flash bulb unit and a positive potential as the shutter time setting signal are respectively selected, design may be made such that the predetermined level Ref. is set to zero potential. In the case of the positive potential, the switch device 35 will be closed.

A specific example of the circuit usable in the above-described new type underwater camera and new type speed light is disclosed in U.S. Pat. No. 4,016,575 and Japanese Laid-open Patent Application No. 63753/1979 gazette (Japanese Patent Application No. 129245/1977).

The effects obtained by the device of the present invention are as follows:

The socket of the new type underwater camera may be designed so as to be interchangeable with the socket of the old type underwater camera which can use both an underwater electronic flash unit and an underwater flash bulb unit. Accordingly, both the new and old camera can use new and old electronic flash units.

A protective circuit is provided in the new type underwater camera. Accordingly, even if a flash bulb unit is used by mistake with the new type underwater camera, the circuit in the new type underwater camera will not malfunction or be damaged.

We believe that the construction and operation of our novel camera having a connector common to a flash bulb unit and electronic flash unit will now be understood, and that the advantages thereof will be fully appreciated by those persons skilled in the art.

We claim:

1. A camera provided with first connecting means capable of being selectively coupled to second connecting means of a flash bulb unit and third connecting means of an electronic flash unit, and having a first terminal connected in common to a synchronizing terminal in said second connecting means and a tuning shutter time setting signal terminal in said third connecting means, a second terminal connected to a synchronizing terminal in said third connecting means, and a third terminal connected in common to ground terminals in said second and third connecting means, said camera including:
    a tuning shutter time setting circuit having its input terminals connected to said first terminal, said circuit being adapted automatically to set the shutter time to an electronic flash unit tuning shutter time by receiving a tuning shutter time setting signal as input; and
    a protective circuit for said tuning shutter time setting circuit, said protective circuit being adapted to detect, from a voltage applied between said first terminal and said third terminal, that said second connecting means has been connected and, as the result of said detection, to prevent the voltage of said first terminal from being applied as input to said setting circuit.

2. A camera according to claim 1, wherein said tuning shutter time setting signal is set to a positive potential with respect to ground, the signal produced at the synchronizing terminal in said second connecting means is set to a negative potential with respect to ground, and said protective circuit includes a diode connected between said first terminal and the input terminal of said tuning shutter time setting circuit, the anode of said diode being connected to said first terminal and the cathode of said diode being connected to the input terminal of said setting circuit.

3. A camera according to claim 2, wherein said protective circuit further includes a diode having its cathode connected to the input terminal of said tuning shutter time setting circuit and its anode connected to ground.

4. In an underwater camera system including a first underwater camera provided with:
    (a) an underwater flash bulb unit having first connecting means containing therein a synchronizing terminal and a ground terminal;
    (b) an underwater electronic flash unit having second connecting means similar in shape to said first connecting means, said second connecting means containing therein a ground terminal provided at a position corresponding to said ground terminal of said first connecting means and a synchronizing terminal provided at a position different from the position corresponding to the synchronizing terminal of said first connecting means; and
    (c) third connecting means capable of being coupled to said first and said second connecting means and containing therein a first terminal for connection to the synchronizing terminal of said first connecting means, a second terminal for connection to the synchronizing terminal of said electronic flash unit, and a third terminal for connection to the ground terminals in said first and second connecting means;
    the improvement wherein said electronic flash unit has a tuning shutter time setting signal output circuit, a fourth terminal capable of being coupled to said first terminal provided at a predetermined location of said second connecting means corresponding to said first terminal, said fourth terminal being connected to the output terminal of said output circuit; and wherein
    a second underwater camera is provided having fourth connecting means capable of being coupled to said first and said second connecting means and containing therein a fifth terminal for connection to said fourth terminal, a sixth terminal for connection to the synchronizing terminal of said electronic flash unit and a seventh terminal for connection to said ground terminal, and having a tuning shutter time setting circuit having its input terminal for connection to said fifth terminal, said circuit being adapted automatically to set the shutter time to electronic flash unit tuning shutter time by receiving a tuning shutter time setting signal as input, and a protective circuit for said tuning shutter time setting circuit, said protective circuit being adapted to detect, from a voltage applied between said fifth terminal and said seventh terminal, that the synchronizing terminal of said bulb unit has been connected to said fifth terminal and as the result of said detection, to prevent the voltage of said fifth terminal from being applied as input to said setting circuit.

* * * * *